United States Patent [19]

Yanabu et al.

[11] 4,262,215

[45] Apr. 14, 1981

[54] DIRECT CURRENT INTERRUPTER

[75] Inventors: Satoru Yanabu, Machida; Tohru Tamagawa, Chigasaki; Hisatoshi Ikeda, Zushi; Hidekiyo Mayama, Yokohama, all of Japan

[73] Assignee: Tokyo Shibaura Denki Kabushiki Kaisha, Kawasaki, Japan

[21] Appl. No.: 37,892

[22] Filed: May 10, 1979

[51] Int. Cl.³ .............................................. H02H 1/04

[52] U.S. Cl. ...................................... 307/91; 307/147; 337/293

[58] Field of Search ........................ 307/32, 89, 90, 91, 307/104, 147, 146, 148, 149, 42; 363/50, 51; 337/292, 293, 144, 412, 4, 284; 200/144 R, 145; 361/347, 349, 353, 357, 360, 431

[56] References Cited

U.S. PATENT DOCUMENTS

| | | | |
|---|---|---|---|
| 3,461,218 | 8/1969 | Buchhold | 307/90 |
| 3,613,039 | 10/1971 | Curtis | 337/293 |

FOREIGN PATENT DOCUMENTS 40-17924 8/1965 Japan .

*Primary Examiner*—Joseph W. Hartary

*Assistant Examiner*—S. D. Schreyer

*Attorney, Agent, or Firm*—Oblon, Fisher & Spivak

[57] ABSTRACT

A direct current interrupter comprising a plurality of two-point interrupter units each including a pair of interrupting portions. The interrupting portions of the interrupter units are arranged at regular angular intervals on a circle with the axial line of the interrupter as its center and arranged parallel to the axial line. An input terminal is provided to supply shunted current to one interrupting portion of each interrupter unit. An output terminal is provided to receive the shunted current from the other interrupting portion of each interrupter unit. A first common connecting portion and a second common connecting portion near the axial line. The main current flows through a conductor line from the main current input terminal to the first common connecting portion and shunted. The shunted current is supplied to the input terminal of each interrupter unit, flows through the two interrupting portions of the interrupter unit in the opposite directions, and is delivered from the output terminal of the interrupter unit. The shunted current flows through the second common connecting portion and delivered from the main current output terminal.

3 Claims, 14 Drawing Figures

DIRECT CURRENT INTERRUPTER

BACKGROUND OF THE INVENTION

This invention relates to a direct current interrupter for interrupting a large direct current, using a plurality of interrupter units.

Generally a direct current interrupter is used to interrupt direct current, whenever necessary, in an electric system. Thus, it effectively makes the system function more dynamically in transmitting direct current or in converting direct current into alternating current to be applied to a loading point. When direct current is relatively small, it is sufficient to use only one direct current interrupter of commutation type, wherein a commutation condenser is connected in parallel to, for example, an interrupting portion and vibrating current generated by the condenser is superposed on an input direct current thereby to form a non-current point. The interrupter of this type, however, cannot interrupt a large current.

To interrupt a large direct current, a plurality of parallel branch circuits have been conventionally used. More precisely, a large direct current is shunted to flow through the parallel branch circuits each having an interrupter unit with an interrupting capacity corresponding to the shunted direct current, and the interrupter units are operated substantially at the same time. FIG. 1 shows one of such large direct current interrupter connected to a pair of bus bars X and Y. The interrupter comprises an input terminal A and an output terminal B. Through the bus bars A and B a direct current to be interrupted flows. Between the input and output terminals are arranged four parallel branch circuits through a first common connecting portion A0 at the input side thereof and a second common connecting portion B0 at the output side thereof, and two-point interrupter units P1, P2, P3 and P4 are connected to the branch circuits R1, R2, R3 and R4, respectively. Arrows in FIG. 1 show the direction in which current flows. Each of interrupter units P1, P2, P3 and P4 is provided with two interrupting portions S1 and S2, S3 and S4, S5 and S6, and S7 and S8, respectively, and the interrupting portions S1 to S8 are arranged on a same plane and connected so as to cause current to flow in opposite direction in the adjacent interrupting portions.

In the known interrupter, however, the interrupter units are not arranged properly, causing the following troubles. At the interrupter unit of one of the branch circuit a magnetic field is generated by the other branch circuits. The magnetic field is intense enough to affect arcs generated at one or more interrupting portions. In addition, the branch circuits have different DC resistance and different reactances, and different currents therefore flow through them. As a result, the interrupter often become inoperative.

SUMMARY OF THE INVENTION

The object of the present invention is to provide a direct current interrupter wherein the interrupter units and connecting lines thereof are arranged in such a way that magnetic field which gives bad influence to the interrupting operation of an interrupter units connected to a branch circuit, which magnetic field is generated by the other branch circuits, is reduced to a low level and that direct current resistance and reactance are made substantially equal in each of branch circuits.

To attain the above-mentioned object, a direct current interrupter according to this invention uses a plurality of interrupter units which can interrupt shunted currents of a main current and which are arranged at regular angular intervals on a circle with the axial line of the interrupter as its center. A preferred embodiment of this invention comprises a plurality of interrupter units for interrupting shunted currents of a main current; a plurality of input terminals for receiving the shunted currents; a plurality of output terminals for transmitting the shunted currents; input and output terminals for main current arranged on one side of the axial line and adjacent to each other at the center of circle; an input conductor line including a first common connecting portion arranged at the center of circle, a first conductor line portion connecting the input terminal for main current to the first common connecting portion, and second conductor line portions connecting the first common connecting portion to the input terminals of interrupter units; and an output conductor line including a second common connecting portion arranged at the center of circle, a third conductor line portion connecting the main current output terminal to the second common connecting portion and being parallel to the first conductor line portion, and fourth conductor line portions connecting the second common connecting portion to the output terminals of interrupter units.

Preferably, the first conductor portion and the second conductor portion constitute a coaxial conductor.

In the above-described direct current interrupter of this invention, the magnetic field applied to the interrupter unit of one of the branch circuits and generated by the other branch circuits is offset to have a low intensity since the interrupter units and connecting lines are arranged in such a specific manner as mentioned above. The magnetic field, rendered far less intense, does not alarmingly affect the arcs generated in the interrupter. Further, since the DC resistances and reactances of the branch circuits have substantially the same values, substantially the same current flows in all the branch circuits when the interrupter interrupts the large direct current. Thus, the interrupter can achieve a safe and reliable interruption of direct current.

In the embodiments of the present invention two-point interrupter units are used, each of two-point interrupter units having two interrupting portions arranged parallel to each other and connected in series each other in such a way that current flowing through these interrupting portions flows in opposite direction when direct current is caused to flow from the input terminal to the output terminal of interrupter unit, and the interrupter units are arranged in such a way that all of interrupting portions are located on a circle which is drawn taking its center on the central axial line, that current flowing through the interrupting portions flows parallel to the axis of the interrupter, and that current flowing through the adjacent interrupting portions flows in opposite direction.

DETAILED DESCRIPTION OF THE PREFERRED EMBODIMENTS

Figure 1:
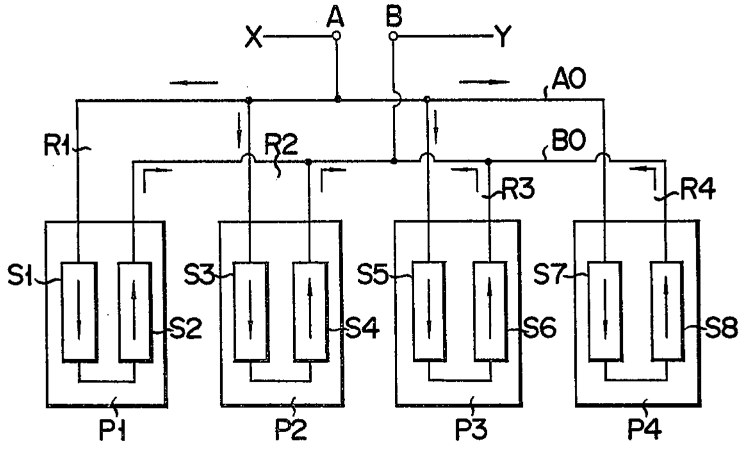
FIG. 1 (PRIOR ART)
FIG. 1 shows the arrangement of a conventional direct current interrupter and the main portion connecting lines.
Figure 2:
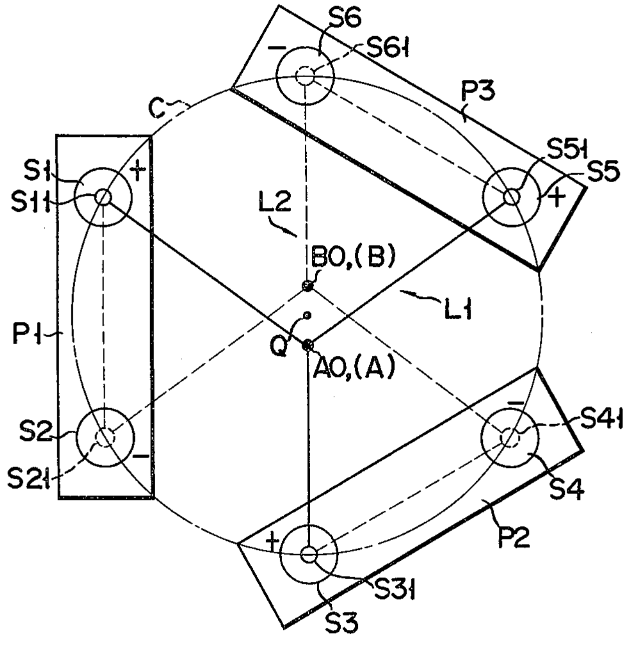
FIG. 2 shows the arrangement of an embodiment of present invention and the main portion of connecting lines thereof.

FIG. 2 is a top view of an embodiment of present invention showing two-point interrupter units P1, P2 and P3 and connecting lines employed in this embodiment. However, a housing for containing these interrupter units therein is omitted. As shown in FIG. 2, the interrupter units P1, P2 and P3 contain therein interrupting portions S1 and S2, S3 and S4, and S5 and S6, respectively. The interrupter units P1, P2 and P3 are arranged in such a way that the interrupting portions thereof are located on a circle C and parallel to the central axial line Q of circle C. Further, the interrupter units are arranged with an interval of 120 degrees therebetween centering around the central axial line Q. Furthermore, the interrupter units are wired to one another in such a manner that current flowing through the adjacent interrupting portions flows in opposite directions. Current in the interrupting portions S1, S3 and S5 to which plus characters are attached flows from the back side to the front side of paper sheet on which FIG. 2 is drawn, while current in the interrupting portions S2, S4 and S6 to which minus characters are attached flows from the front side to the back side of paper sheet.

L1 in FIG. 2 represents an input conductor line connecting the input terminals S11, S31 and S51 of interrupting portions S1, S3 and S5 to a first common connecting portion A0 formed adjacent to the central axial line Q, and extending vertical relative to the paper sheet from the connecting portion A0 to a main current input terminal A for receiving main current to be interrupted. L2 in FIG. 2 denotes an output conductor line connecting the output terminals S21, S41 and S61 of interrupting portions S2, S4 and S6 to a second common connecting portion B0 formed adjacent to the first common connecting portion A0, and extending vertical relative to the paper sheet from the connecting portion B0 to a main current output terminal B, said output conductor line L2 being shown in broken line in FIG. 2.

Figure 3A:
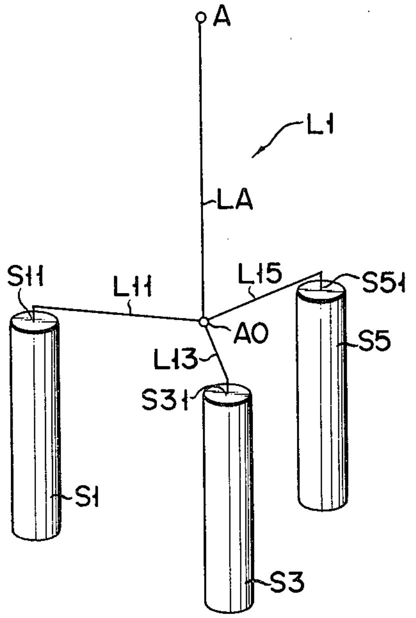
FIGS. 3A and 3B are perspective views showing input and output conductor lines employed in the direct current interrupter shown in FIG. 2.
Figure 3B:
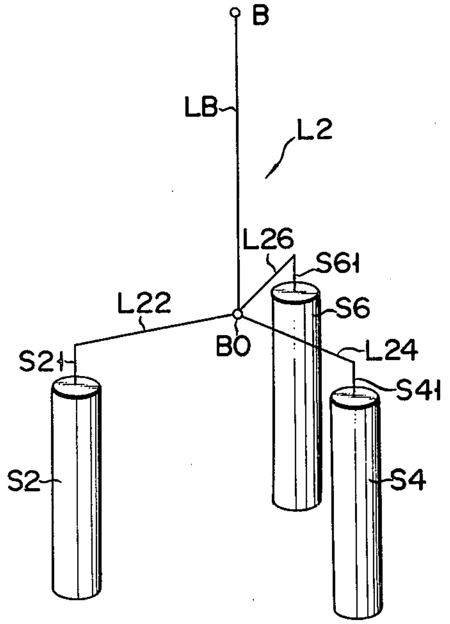

FIGS. 3A and 3B are perspective views showing the shape of input and output conductor lines L1 and L2. The input conductor line L1 comprises second conductor line portions L11, L13 and L15 connecting the input terminals S11, S31 and S51 of interrupting portions S1, S3 and S5 to the first common connecting portion A0, and a first conductor line portion LA connecting the first common connecting portion A0 to the main current input terminal A. Since the first conductor line portion LA is directed vertical relative to the paper sheet in FIG. 2, it is shown in a black point, to which characters A and A0 are attached. The output conductor line L2 comprises fourth conductor line portions L22, L24 and L26 connecting the output terminals S21, S41 and S61 of interrupting portions S2, S4 and S6 to the second common connecting portion B0 respectively, and a third conductor line portion LB connecting the second common connecting portion B0 to the main current output terminal B. Since the third conductor line portion LB is directed vertical relative to the paper sheet in FIG. 2, it is shown in a black point, to which characters B and B0 are attached.

Figure 3C:
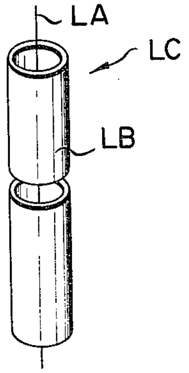
FIG. 3C shows a coaxial conductor which is constituted by a first conductor line portion and a third conductor line portion which run in parallel to the input and output conductor lines shown in FIGS. 3A and 3B, respectively.

In practice, it is desired that the first conductor line portion LA and the third conductor line portion LB be put together to form such a coaxial conductor as shown in FIG. 3C. Such a coaxial conductor helps offset the magnetic field more effectively.

Main current flows from the main current input terminal A to the first common connecting portion A0 through the second conductor line portion LA, is shunted to three shunted flows to flow through the first conductor line portions L11, L13 and L15, the input terminals S11, S31 and S51 of interrupter units P1, P2 and P3, the interrupting portions S1, S3 and S5, the output terminals S21, S41 and S61 of interrupter units P1, P2 and P3 to which are connected the interrupting portions S2, S4 and S6 at the back side of paper sheet as shown in broken line in FIG. 2, and the third conductor line portions L22, L24 and L26, and combined to a flow again at the second common connecting portion B0 to flow through the fourth conductor line portion LB to the main current output terminal B, from which current is supplied as output to an external circuit.

As described above, main current is shunted to the branch circuits of substantially same loop shape including the interrupter units P1, P2 and P3 arranged with an interval of 120 degrees therebetween and each having two interrupting portions which cause current to flow in opposite direction. Therefore, the direct current interrupter thus formed has such advantages that magnetic field generated in each of interrupter units by the current flowing through the other branch circuits includes many components, which are offset one another, and is therefore reduced to a low level, and that direct current resistance and reactnace are made equal in value in the branch circuits. This makes it difficult for arc generated upon current interruption to become too intense. Accordingly, the direct current interrupter enables a safe and secure interruption of main current to be attained. In addition, since direct current resistance and reactance in each of branch circuits are reduced due to the above-mentioned arrangement of interrupter units and wiring, it becomes extremely easy to change current flow from a main contact to an interrupting contact when main contacts and interrupting contacts are provided in the interrupting portions S1 to S6. If the diameter of circle is properly selected before the interrupter units P1, P2 and P3 are arranged on a circle and all of interrupting portions S1 to S6 are arranged with an interval of 60 degrees therebetween, the offset of magnetic field can be extremely effectively attained thereby to greatly enhance the interrupting capability of direct current interrupter.

Figure 4:
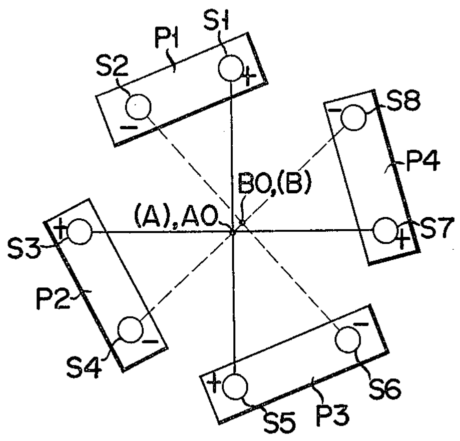
FIGS. 4 and 5 show the arrangement of two other embodiments of present invention and the main portion of connecting lines thereof.

The above-mentioned embodiment uses three branch circuits, but more branch circuits may be employed when current to be interrupted is large. FIG. 4 shows another example of direct current interrupter having four branch circuits each provided with two-point interrupter units. Since the arrangement and wiring of interrupter units in this example are apparent from the description relative to FIG. 2 and from FIG. 4, further description is omitted.

Figure 5:
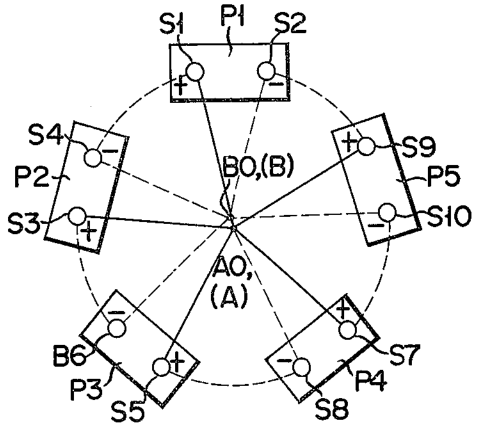

FIG. 5 shows still another embodiment, in which two-point interrupter units P1, P2, P3, P4 and P5 having two interrupting portions S1 and S2, S3 and S4, S5 and S6, S7 and S8, and S9 and S10, respectively, are arranged on a circle with same interval therebetween. This embodiment is different in the number of interrupter units and in a portion of wiring thereof from the one shown in FIG. 2. Namely, each interrupting portion of an interrupter unit is connected at the back side of paper sheet to a closer one of two interrupting portions of adjacent interrupter unit. As shown in broken line in FIG. 5, connection is made at the back side of paper sheet between S1 and S4, S3 and S6, S5 and S8, S7 and S10, and S9 and S2, respectively. This embodiment can attain same effects as those attained by the direct current interrupter device shown in FIG. 2.

Figure 6:
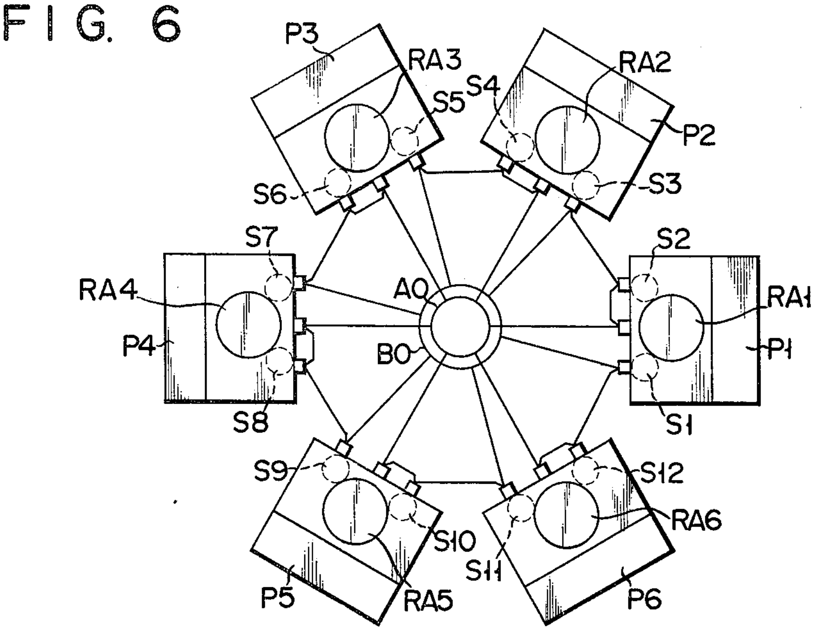
FIGS. 6 and 7 show the arrangement and the main portion of connecting lines of other embodiment in which a saturable reactor is connected in series to each of interrupter units.
Figure 7:
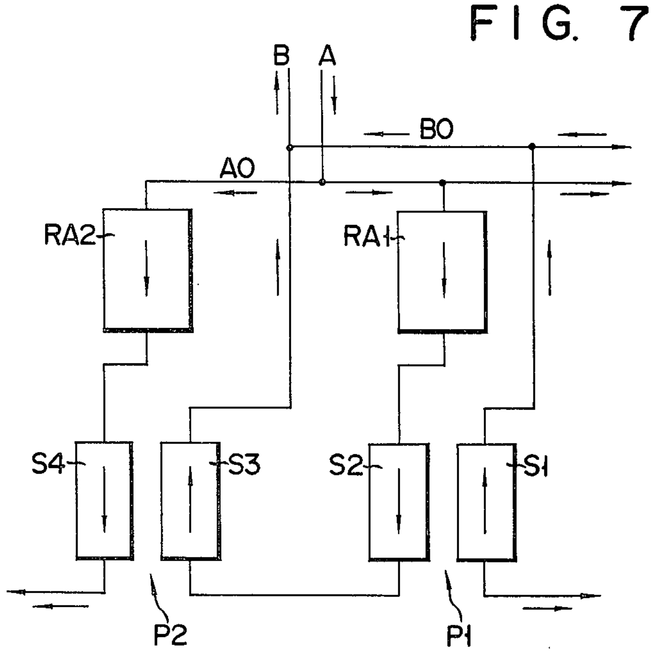

FIGS. 6 and 7 show a still further embodiment in which six two-point interrupter units P1, P2, P3, P4, P5 and P6 are arranged with a same interval therebetween on a circle so as to shunt main current to six branch circuits. This embodiment is different from the above-mentioned ones in that the branch circuits to which main current is shunted are provided with saturable reactors RA1, RA2, RA3, RA4, RA5 and RA6, respectively. A0 and B0 in FIG. 6 represent first and second common connecting portions. S1 and S2, S3 and S4, S5 and S6, S7 and S8, S9 and S10, and S11 and S12 denote interrupting portions provided in the interrupter units P1, P2, P3, P4, P5 and P6, respectively.

FIG. 7 shows the interrupter units P1 and P2 of the ones shown in FIG. 6. Three lines directed to the right of Figure with arrows attached to the tops thereof and a line directed to the left of Figure with an arrow attached to the top thereof are conductor lines for connecting these interrupter units to the other ones. As shown in FIGS. 6 and 7, a saturable reactor is arranged above the both interrupting portions of each interrupter unit in this embodiment. A shunted flow flowing through one of six branch circuits employed in this embodiment will be now described. Current coming from the main current input terminal A is shunted at the first common connecting portion A0 to six branched currents, one of which flows through the saturable reactor RA1, the interrupting portion S2 of interrupter unit P1 and the interrupting portion S3 of interrupter unit P2 to the second common connecting portion B0, from which said current further flows through the main current output terminal B to an external circuit. It should be noted that the current flowing through the interrupting portion S3 of interrupter unit P2 is directed in a direction opposite to that in the interrupting portion S2 of interrupter unit P1.

Figure 8:
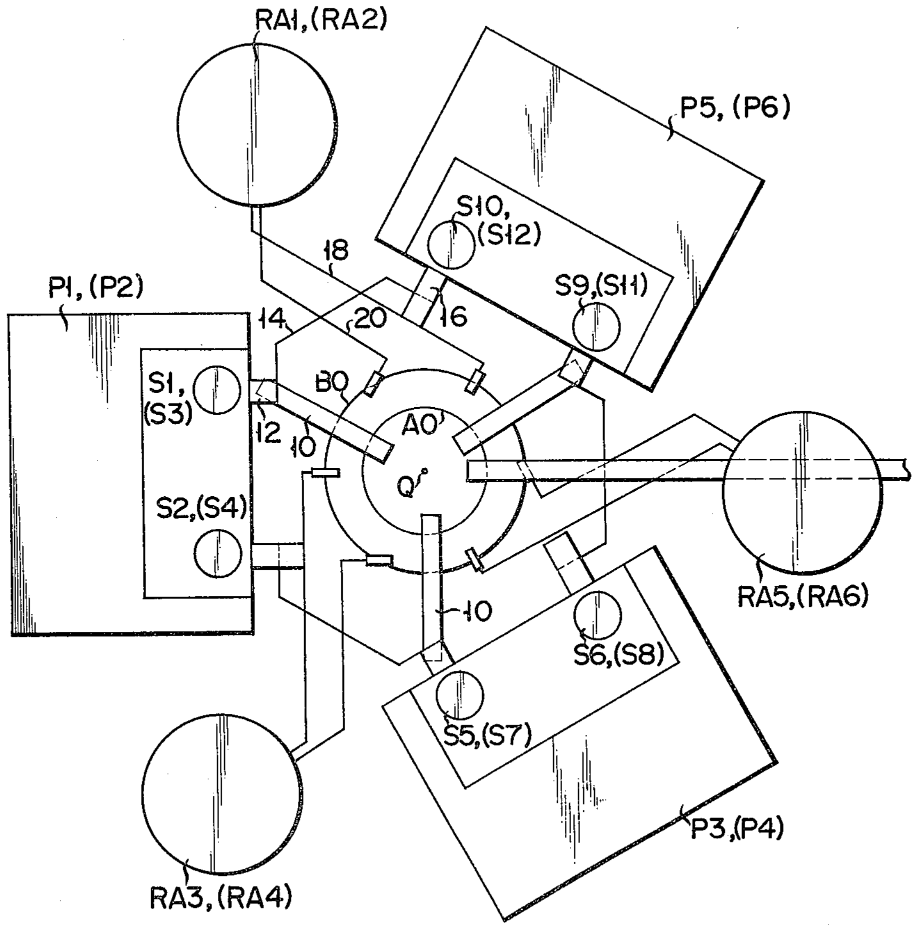
FIGS. 8 and 9 show the arrangment of an embodiment and the main portion of connecting lines thereof in which a combination of interrupter units each being provided with a saturable reactor is laid upon another combination thereof.
Figure 9:
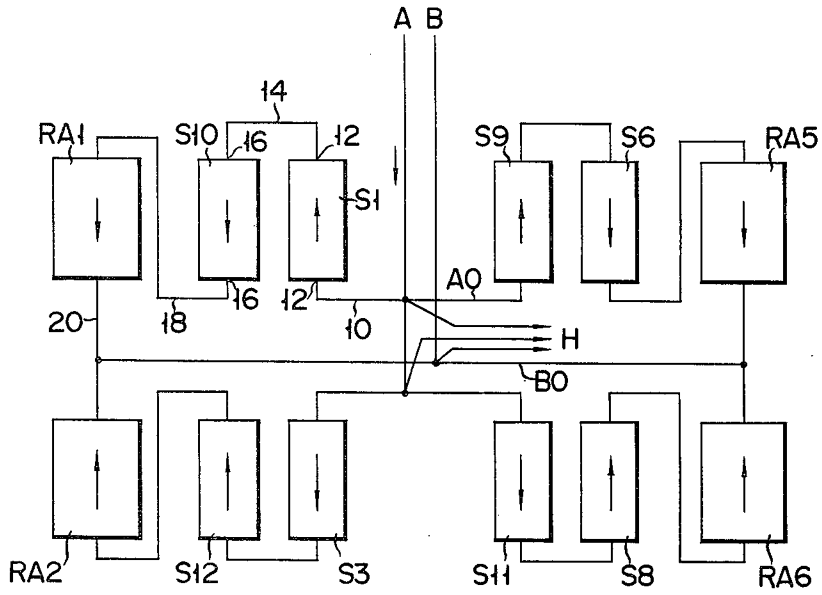

FIGS. 8 and 9 show a still further embodiment in which are employed six interrupter units P1, P2, P3, P4, P5 and P6 each having two interrupting portions and six saturable reactors RA1, RA2, RA3, RA4, RA5 and RA6. The feature of this direct current interrupter exists in that a combination of interrupter units and saturable reactors is laid upon another combination thereof in two stages.

The interrupter units P1 and P2, P3 and P4, and P5 and P6 are arranged in such a manner that P1, P3 and P5 are laid upon P2, P4 and P6, respectively. The interrupter units P1, P2, P3, P4, P5 and P6 are provided with the interrupting portions S1 and S2, S3 and S4, S5 and S6, S7 and S8, S9 and S10, and S11 and S12, respectively, and the interrupting portions S1 and S3, S2 and S4, S5 and S7, S6 and S8, S9 and S11, and S10 and S12 are arranged in such a way that S1, S2, S5, S6, S9 and S10 are laid upon S3, S4, S7, S8, S11 and S12, respectively. The saturable reactors RA1 and RA2, RA3 and RA4, and RA5 and RA6 are also arranged in such a way that RA1, RA3 and RA5 are laid upon RA2, RA4 and RA6, respectively. Since hidden behind the upper interrupter units, interrupting portions and saturable reactors, the lower ones are shown by bracketed numerals in FIG. 8.

When this direct current interrupter device is viewed from the top thereof as shown in FIG. 8, the interrupter units P1 and P2, P3 and P4, and P5 and P6 are arranged with an angular interval of 120 degrees therebetween centering around the central axial line Q which extends vertical relative to the paper sheet so as to locate their interrupting portions S1 to S12 on a circle also centering around the central axial line Q. A0 and B0 in FIG. 8 represent first and second common connecting portions. This direct current interrupter comprises three upper branch circuits each including two interrupting portions and a saturable reactor, and three lower branch circuits each including two interrupting portions and a saturable reactor. As shown in FIG. 9, the connection between the upper and lower branch circuit is made in such a manner that current is caused to flow in opposite direction in the corresponding interrupting portions and saturable reactors.

In FIG. 9 are shown a first branch circuit including interrupting portions S1 and S10 and a saturable reactor RA1, a second branch circuit including interrupting portions S3 and S12 and a saturable reactor RA2, a third branch circuit including interrupting portions S9 and S6 and a saturable reactor RA5, and a fourth branch circuit including interrupting portions S11 and S8 and a saturable reactor RA6. Fifth and sixth branch circuits (not shown in FIG. 9) are formed in same fashion. Three conductor lines H directed to the right in FIG. 9 with arrows attached to the tops thereof are connected to the fifth and sixth branch circuits. Current in the first branch circuit is shunted at the first common connecting portion A0, rises through the interrupting portion S1, and falls through the interrupting portion S10, and comes to the second common connecting portion B0 flowing through the saturable reactor RA1 from the top to the bottom thereof. Current in the second branch circuit flows through the conductor portion A0, the interrupting portions S3, S12, and the saturable reactor RA2 to the second common connecting portion B0. Arrows in FIG. 9 show the direction at which current flows through the interrupting portions and saturable reactors. As apparent from FIG. 9, current flows in opposite direction in the corresponding upper and lower interrupting portions and saturable reactors.

Same thing can be said to the third, fourth, fifth and sixth branch circuits.

In FIGS. 8 and 9, numeral 10 represents a conductor line connecting the first common connecting portion A0 to the terminal 12 of interrupting portion S1, 14 a conductor line connecting the terminal 12 to the terminal 16 of interrupting portion S10, 18 a conductor line connecting the terminal 16 to the saturable reactor RA1, and 20 a conductor line connecting the saturable reactor RA1 to the second common connecting portion B0. Other terminals and conductor lines are respectively shifted by 120 degrees from the terminals and conductor lines mentioned above and same in construction. Therefore, numerals are omitted.

Figure 10:
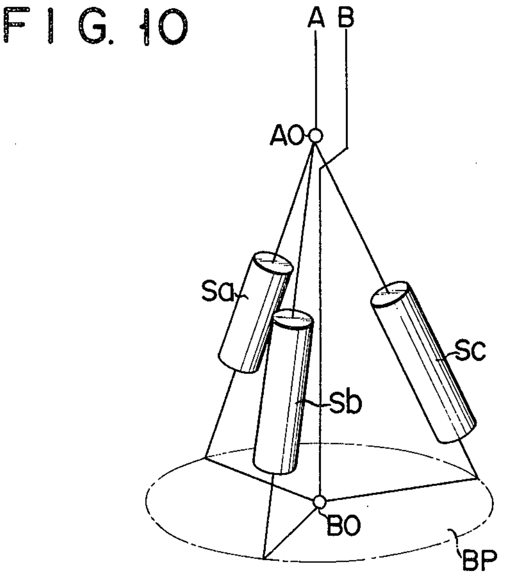
FIG. 10 shows the arrangement of an embodiment and the main portion of connecting lines thereof in which plural interrupting portions are arranged on a conical surface.

The present invention is not limited to the above-mentioned embodiments. When three interrupting portions Sa, Sb and Sc are inserted between the main current input and output terminals A and B, it may be arranged as shown in FIG. 10, for example, so that the interrupting portions Sa, Sb and Sc are located with the same interval therebetween on the surface of a cone, which is formed taking the first common connecting portion A0 as its peak. In this case, conductor lines extending from the first common connecting portion A0, which is connected to the main current input terminal A, to the tops or input sides of interrupting portions Sa, Sb and Sc are selected to have about the same length, and the second common connecting portion B0 is located on the axial line of cone. Conductor lines extending from the bottoms or output sides of interrupting portions Sa, Sb and Sc are radially bent at the circumference of cone bottom BP and along the cone bottom to reach the connecting portion B0, respectively. The conductor line connecting the connecting portion B0 to the main current output terminal B extends upwardly from the connecting portion B0 along the axial line of cone, is bent sidewards to avoid the connecting portion A0, and then extends further adjacent and parallel to the conductor line, which connects the terminal A to the connecting portion A0, to the main current output terminal B. The path through which the shunted current flows in each of branch circuits forms the outer circumference of an equilateral triangle, and three branch circuits same in shape are arranged with an angular interval of 120 degrees therebetween centering around the axial line of cone. Therefore, each magnetic field generated at the interrupting portion of a branch circuit by the other branch circuits is reduced to a low level and substantially with one another, and direct current resistance and reactance are made to have same values in each of branch circuits, thus enabling this direct current interrupter to attain same effects as obtained by the embodiment shown in FIG. 2.

Figure 11A:
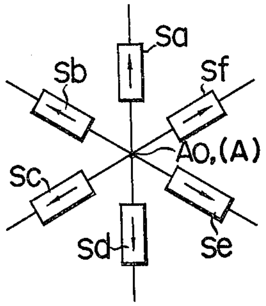
FIGS. 11A and 11B show the arrangment of an embodiment and the main portion of connecting lines thereof in which plural interrupting portions are arranged in radial shape on a plane.
Figure 11B:
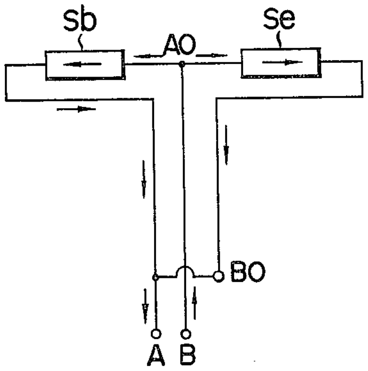

FIG. 11A shows a still further embodiment of present invention in which six interrupter units Sa, Sb, Sc, Sd, Se and Sf are radially arranged on a plane with an angular interval of 60 degrees therebetween centering around the first common connecting portion A0 and equally spaced from the center A0. FIG. 11B shows two branch circuits of a embodiment shown in FIG. 11A including the first common connecting portion A0 and the interrupting portions Sb and Se. The wiring manner of the other pairs of interrupting portions Sa, Sd and Sc, Sf is same as shown in FIG. 11B.

In FIG. 11B, current coming from the main current input terminal A is shunted at the first common connecting portion A0, one of the shunted currents flows through the interrupting portion Sb to the second common connecting portion B0 while the other shunted current through the interrupting portion Se to the second connecting portion B0, where the shunted currents are combined to flow through the main current output terminal B to an external circuit. As shown in FIGS. 11A and 11B, six branch circuits including interrupting portions are formed in same loop and radially arranged with an interval of 60 degrees interposed therebetween, so that magnetic field applied to each of interrupting portions is reduced to a low level in each of interrupting portions and direct current resistance and reactance are made substantially equal in each branch circuit.

What we claim is:

1. A direct current interrupter for interrupting a main direct current, comprising: a plurality of interrupter units capable of interrupting shunted currents of the main direct current and arranged at regular angular intervals on a circle with the axial line of the interrupter as its center; said interrupter units each including a pair of interrupting portions, the interrupting portions of said interrupter units being arranged on said circle in such a manner that current flows through them parallel to said axial line and current flowing through any two adjacent interrupting portions flows in opposite directions.

2. A direct current interrupter for interrupting a main direct current, comprising: a plurality of interrupter units capable of interrupting shunted currents of the main direct current and arranged at regular angular intervals on a circle with the axial line of the interrupter as its center; said interrupter units each being a two-point interrupter unit including a pair of interrupting portions arranged parallel to each other and connected in series to each other so that current flows through them in opposite directions when a current flows from the input terminal to the output terminal of the interrupter unit.

3. A direct current interrupter for interrupting a main direct current, comprising: a plurality of interrupter units capable of interrupting shunted currents of the main direct current and arranged at regular angular intervals on a circle with the axial line of the interrupter as its center; said direct current interrupter further comprising a plurality of saturable reactors connected in series to said interrupter units, respectively.

* * * * *